Aug. 26, 1969    W. T. MOORE    3,462,963
APPARATUS FOR PIPELAYING AND TRENCHING
OPERATIONS IN A BODY OF WATER
Filed Aug. 2, 1967    5 Sheets-Sheet 1
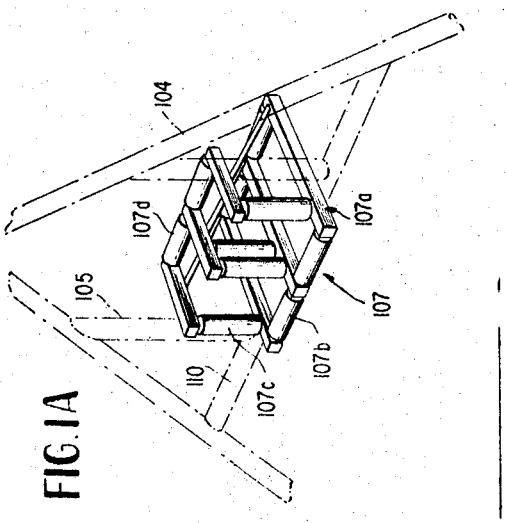
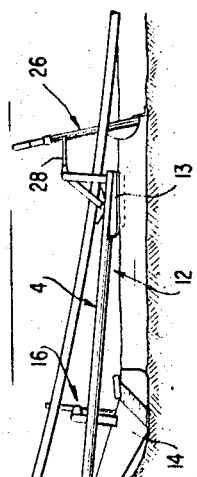
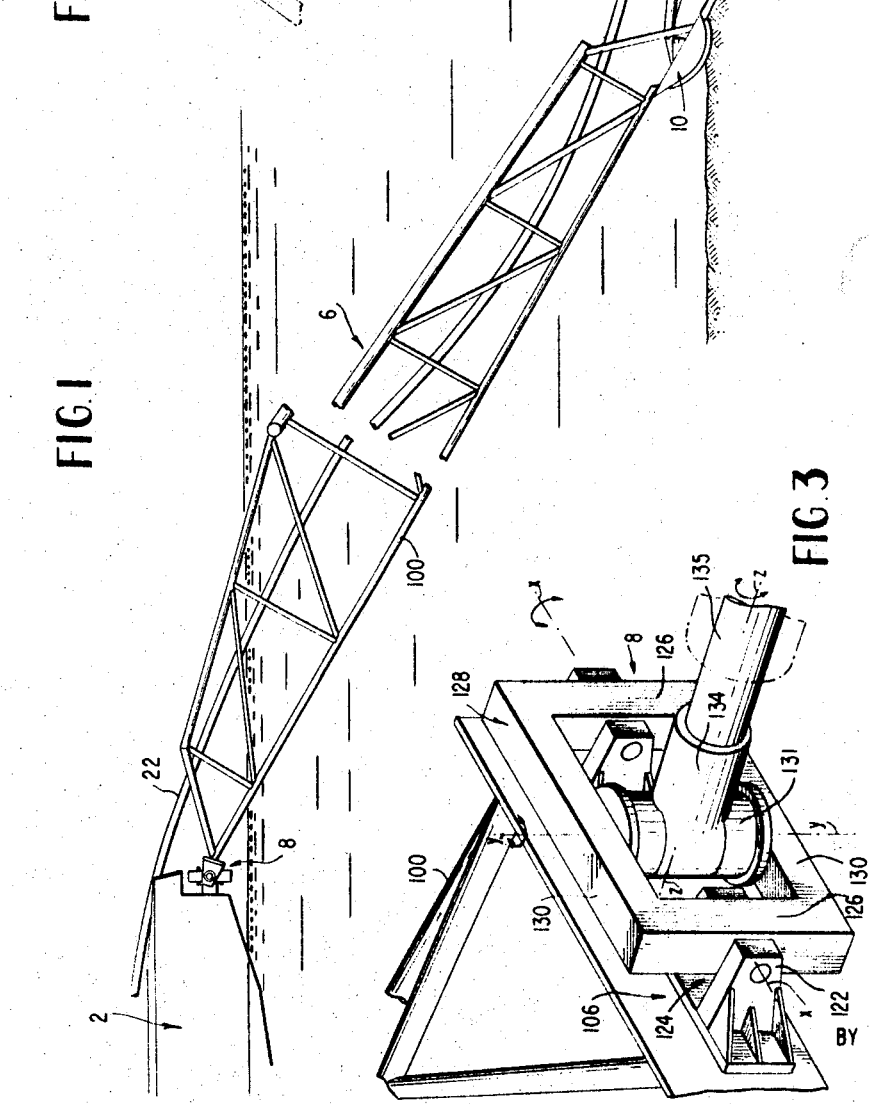
INVENTOR
WARREN T. MOORE
BY
ATTORNEYS

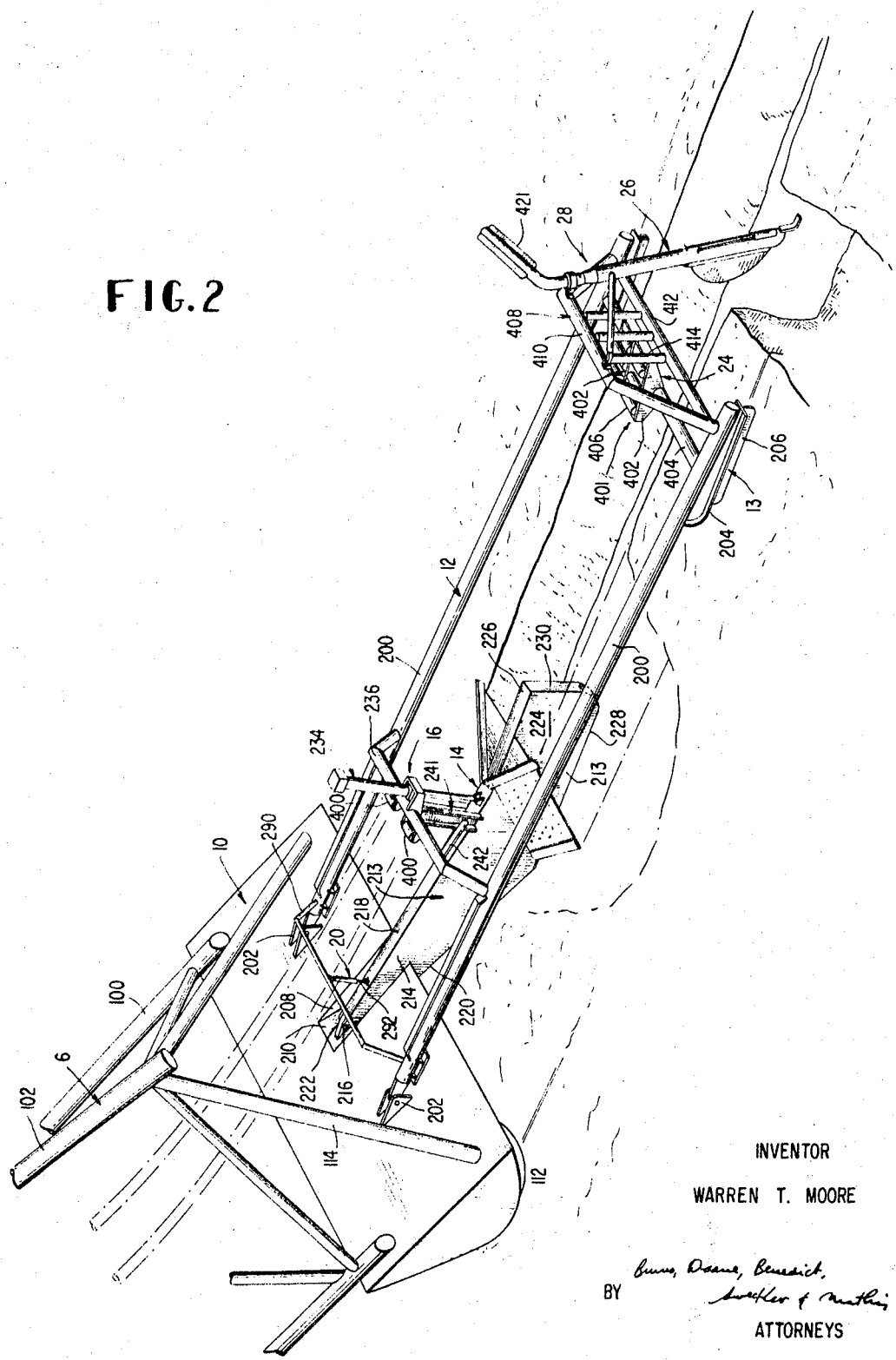

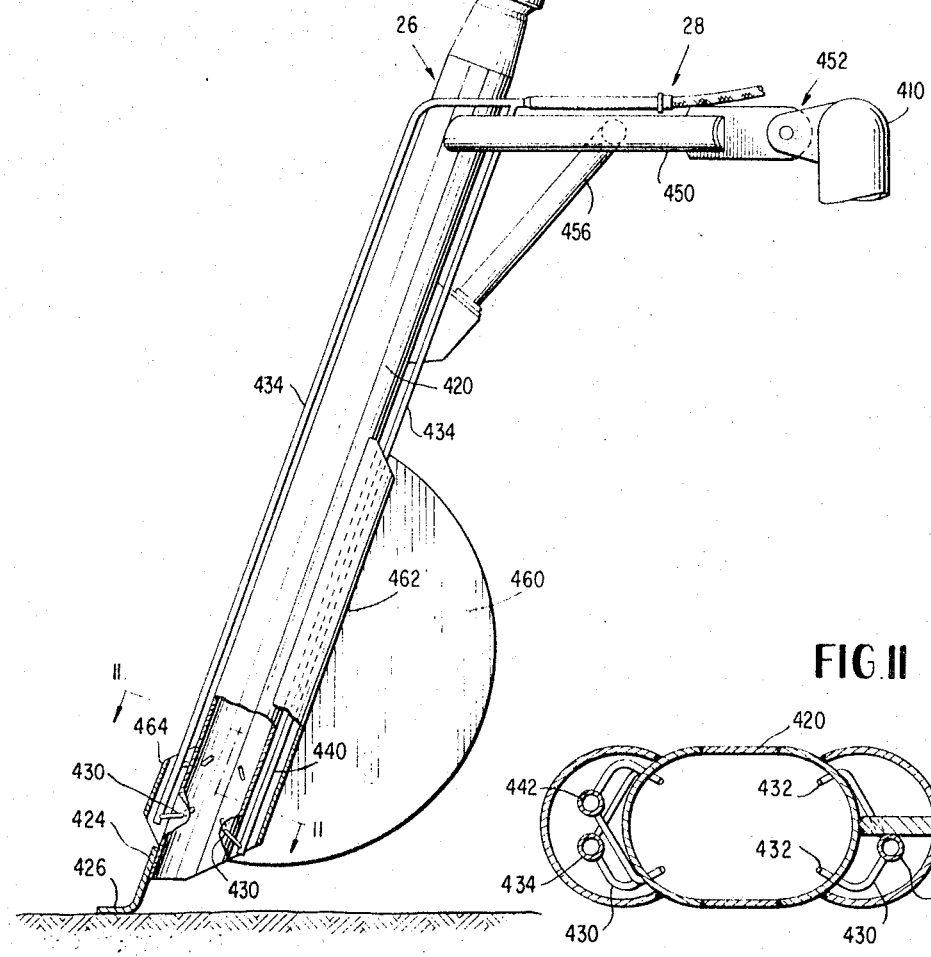

United States Patent Office 3,462,963
Patented Aug. 26, 1969

3,462,963
APPARATUS FOR PIPELAYING AND TRENCHING OPERATIONS IN A BODY OF WATER
Warren T. Moore, Anchorage, Alaska, assignor to Brown & Root, Inc., Houston, Tex., a corporation of Texas
Filed Aug. 2, 1967, Ser. No. 657,802
Int. Cl. B63b 35/04; F16l 1/00; E02f 3/92
U.S. Cl. 61—72.4
16 Claims

ABSTRACT OF THE DISCLOSURE

A method of underwater trenching utilizing a floating vessel and which includes the steps of providing ground-engaging means adapted to slide along the bed of a body of water, and adjustably connecting a plow to the ground engaging-means for selective, vertically adjustable movement relative thereto. In additional steps, the plow is moved to extend to a predetermined depth beneath the ground-engaging means and is fixedly secured thereto. The ground-engaging means is connected with the vessel and towed along the bed to cut a trench of predetermined depth. Another method aspect includes the step of providing an eductor to remove detritus from the trench behind the plow and of pivotally mounting the eductor for free swinging motion about a horizontally disposed axis. A further method aspect includes providing a rigid elongate ramp for connecting the ground-engaging means to the vessel and supporting the upper end of the ramp for movement relative to the vessel about one pivotal axis extending transversely of the ramp and two mutually perpendicular rotational axes perpendicular to the pivotal axis.

---

Apparatus for performing underwater earth working operations utilizing a floating vessel, and which includes ground-engaging means adapted for sliding motion on and along the bed. Towing means connect the ground-engaging means to the vessel. A plow means adapted for cutting a trench in the bed is connected by selectively adjustable connecting means to the ground-engaging means. The connecting means may be selectively vertically adjusted to cause the plow to extend to varying predetermined distances below the ground-engaging means to vary the depth of the trench cut. Another apparatus aspect includes the provision of an eductor for removing detritus from the trench behind the plow. The eductor is pivotally mounted to the second ground-engaging means to permit free swinging motion of the eductor about a horizontally disposed axis. In another apparatus aspect, the towing means includes a rigid elongate ramp connected at its upper end to the vessel by a gimbal mounting permitting relative motion between the ramp and the vessel about one rotational axis extending transversely to the ramp and two mutually perpendicular, rotational axes perpendicular to the one pivotal axis. In another apparatus aspect, the ramp means includes chord members which serve as structural members as well as conductors for hydraulic jet fluids (air, water) between the vessel, the plow, and the eductor.

Background of invention

This invention relates to a method and apparatus for performing earth working operations on the bed of a body of water utilizing a floating vessel and in particular to method and apparatus for performing underwater pipelaying and trenching operations.

In laying entrenched pipe under water, it has been common for many years to perform the necessary pipelaying and trenching operations in separate steps, either by first laying the pipe and subsequently digging the trench beneath it (by means such as a tool running along the pipe), or by first digging the trench and then laying the pipe into it. However, high velocity currents existing in some water bodies constitute a threat to the stability and safety of the pipeline making it necessary or advisable to ditch the line simultaneously with laying. Also for reasons of economy and speed of operation it is now often regarded as desirable to combine the previously separated pipelaying and trenching steps in a single operation. Various methods and apparatus for performing such combined operations frequently include a floating marine vessel connected by towing apparatus to an underwater sled resting on the bed. The sled may include a rigidly fixed plow adapted to cut a trench in the bed during towed motion of the sled behind the vessel. The sled may further include pipe guiding members adapted to engage pipe passed out from the vessel and to guide the pipe into the trench behind the plow.

Although combined pipelaying and trenching systems of the type described have met with some success, certain significant operational disadvantages are frequently encountered in their use.

For example, operational requirements may make it desirable to control or limit the depth of the trench being cut for a variety of reasons such as, for example, the need to provide trenches shallow enough to permit crossing existing lines safely, to avoid problems resulting from uncontrolled burying of the plow, or in order to bury pipe to a greater depth in areas of known turbulence, or because of geological characteristics of the water bottom. However in using a sled of the type described having a rigidly fixed plow, such variation of cut may be very difficult to effect and it may even be necessary to remove the sled from the submerged position for modification above water, thereby leading to increased costs and reduced speed of operation.

Another problem that may arise, utilizing prior apparatus of the type described, is that portions of the bed removed by the plow during trenching may settle back into the trench ahead of the pipe being laid, thereby providing an uneven surface for the pipe to lie on and additionally, reducing the effective depth to which the pipe is buried. In an effort to obviate this problem, it has been proposed to provide an eductor to travel in the trench behind the plow. However, problems may then arise in that the eductor trailing behind the plow, may become hooked about any large obstruction projecting into the trench (such as a rock), which the plow may have previously overridden during its motion ahead of the eductor, thereby causing damage to the eductor.

Other problems may occur in connection with the towing apparatus used to connect the vessel to the sled for towing. For example, in order to provide a support for the pipe during its passage between the vessel and the sled, it may be desirable to utilize rigid towing apparatus such as for example, a rigid elongate stinger or the like. In this event, the various rolling, yawing and pitching motions of the marine vessel relative to the stinger, induced by external forces acting on the vessel such as wind or wave action, may cause considerable loads to be developed in the stinger which may cause fatiguing of the stinger and which, under extreme conditions, may even cause loss of connection to the vessel.

Summary of invention

It is therefore a general object of the invention to provide a method and apparatus for undersea earth working operations intended to obviate problems of the type previously described.

It is a particular object of the invention to provide a method and apparatus for performing trenching operations upon the bed of a body of water wherein the depth of the trench may be readily varied.

It is another object of the invention to provide a method and apparatus for performing trenching operations upon the bed of a body of water wherein trench depths may be varied remotely under the control of persons situated above water.

It is a further object to provide apparatus for digging a submerged trench wherein a continuous indication of the depth of cut of the trenching tool may be provided at a surface vessel.

It is a further object of the invention to provide a method and apparatus for laying submerged entrenched pipe wherein the possibility that portions of bed removed during trenching will resettle and remain in the bed ahead of and beneath the pipe is minimized.

It is a further object of the invention for providing a method and apparatus for laying entrenched submerged pipe utilizing an eductor to remove detritus from the trench rearwardly of a trenching tool, wherein the eductor is free to ride pivotally over any embedded obstruction encountered in the trench.

It is yet another object of the invention to provide a method and apparatus for mounting a rigid elongate ramp or stinger connected to submerged earth working apparatus to a vessel in such a manner as to minimize loading on the stinger and the connection therefor to the vessel, caused by relative motion between the vessel and stinger due to external forces acting on the vessel.

A method of providing a trench in the bed of a body of water according to the preferred embodiment of the present invention utilizes a marine vessel floating on the water and movable forwardly along a longitudinal path. The method includes the steps of providing ground-engaging means adapted to slide on and along the surface of the bed and of connecting the ground-engaging means with the vessel. In further steps, the ground-engaging means is connected with a plow which extends downwardly of the ground-engaging means and is selectively vertically adjustable relative thereto. In additional steps, the depth to which the plow extends below the ground-engaging means is selectively adjusted to a predetermined value, and the plow is then secured to the ground-engaging means so that the plow is free to rise above the selected setting in case obstructions are encountered but will not drop below the selected depth. The ground-engaging means is then towed along the bed by the vessel to cause a trench to be cut therein of predetermined depth.

Another method of aspect of the invention includes the steps of pivotally connecting a sled slidable along the bed to the stinger to follow therebehind, and of pivotally connecting an eductor to the sled adapted to remove detritus from the trench behind the plow. Pivotally connecting the sled and the eductor in this manner permits the eductor to ride freely over any embedded obstruction encountered in the trench, without damage.

A further method aspect of the invention includes the additional steps of providing a rigid elongate ramp, sometimes referred to as a stinger, for connecting the ground-engaging means to the vessel and of supporting the ramp for motion relative to the vessel about one pivotal axis extending transversely of the stinger and about two mutually perpendicular, rotational axes perpendicular to the one pivotal axis to prevent the vessel motions from exerting high loads on the stinger.

An apparatus for performing earth working operations on the bed of a body of water, according to a preferred embodiment of the invention, utilizes a floating marine vessel movable forwardly along a longitudinal path. The apparatus includes ground-engaging means adapted for sliding motion on and along the surface of the bed of the body of water and connected with the vessel means by towing means. Plow means adapted for cutting a trench in the bed is connected with the ground-engaging means by selectively adjustable connecting means. The connecting means are selectively vertically adjustable to limit downward motion of the plow means to predetermined depths below the ground-engaging means whereby the depth of the trench may be varied.

Additionally, the connecting means includes power operated driving means for selectively vertically positioning the plow means relative to the ground-engaging means. The driving means is selectively operated by power means adapted for remote positioning on the vessel so that the depth of cut may be varied remotely while the plow is still submerged.

In order to provide an indication of the depth to which the plow is trenching, sensor means connected between the plow and the ground-engaging means provide a continuous signal proportional to the depth to which the plow is trenching, which signal is transmitted to indicator means on the vessel for providing a remote indication of plow depth.

In an additional apparatus aspect of the invention, the ground-engaging means further includes pivotally connected frame means adapted for sliding motion along the bed adjacent the trench. Pivotally connected to the frame means by second pivot means is an eductor means having a lower end thereof adapted to be positioned in the trench spaced rearwardly of the plow. The eductor means removes detritus from the trench and the second pivotal means permits the eductor means to ride freely over any embedded obstruction encountered in the trench.

In another apparatus aspect of the invention, the towing means comprises a rigid elongate stinger having one end thereof pivotally connected to the ground-engaging means and the other end adapted for connection to the vessel by gimbal hitch means. The gimbal hitch means supports the stinger for rotational movement of the stinger relative to the gimbal hitch means about one pivotal axis extending transversely of the stinger and further supports the stinger for rotational motion thereof relative to the gimbal hitch means about two mutually perpendicular axes both of which are perpendicular to the one pivotal axis. In this manner the stinger is permitted freedom in three planes relative to the vessel so that the imposition of high loads on the stinger by the vessel due to relative motion between them is eliminated.

Other apparatus aspects of the invention reside in the provision of pipe roller guide means connected with the stinger and with the ground-engaging means for guiding pipe from the vessel in a gently curved, sinuous path into the trench, and in the provision of a plow comprising a central member and two relatively outward inclined wings, all of which are provided with forwardly inclined jets for directing fluid at high pressure against the adjacent seabed.

The drawings

An apparatus according to certain preferred embodiments of the invention is illustrated in the accompanying drawings in which:

FIGURE 1 is a side view of a portion of an apparatus for performing earth working operations on the bed of a body of water in accordance with one preferred embodiment of the invention;

FIGURE 1A is a perspective view of a roller station for supporting piping, forming a part of the apparatus shown in FIGURE 1;

FIGURE 2 is a perspective view of certain lower portions of the apparatus shown in FIGURE 1;

FIGURE 3 is a perspective view of a gimbal hitch forming a part of the apparatus shown in FIGURE 1 taken from the other side thereof;

FIGURE 9 is a side view partially in cross-section of a portion of an eductor forming a part of the apparatus shown in FIGURE 1;

FIGURE 10 is a top plan view of a portion of the eductor shown in FIGURE 9; and

FIGURE 11 is a cross-sectional top view of a portion of the eductor shown in FIGURE 9 taken along the line 11—11 therein.

DETAILED DESCRIPTION

General summary

Figure 4:
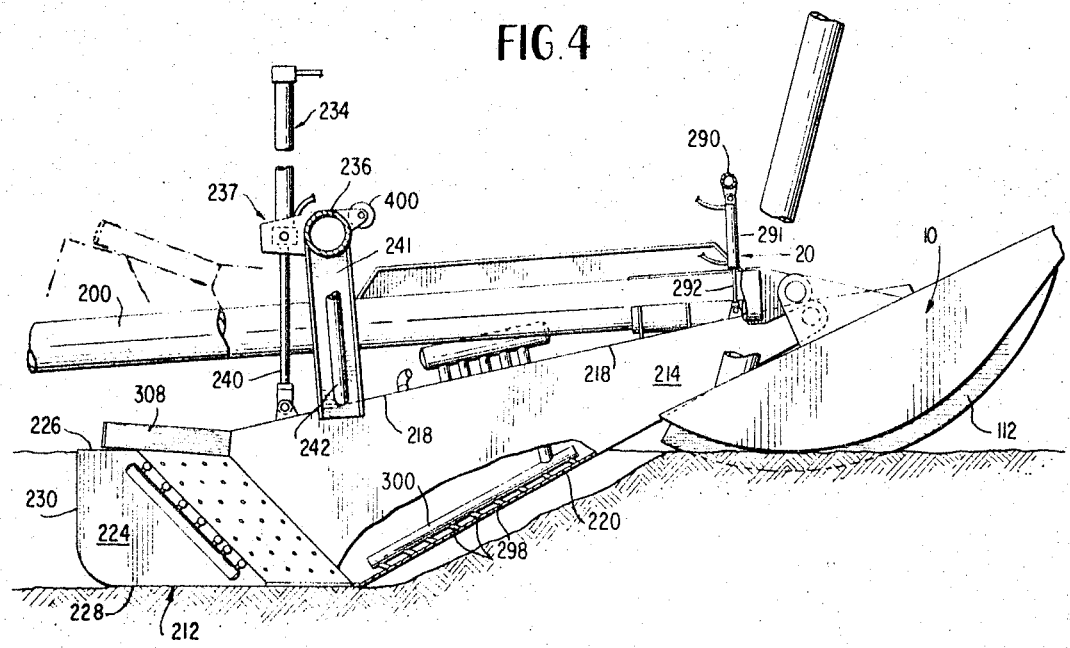
FIGURE 4 is a side view, partially in section, of a portion of the apparatus shown in FIGURE 2 showing a selectively adjustable plow depth control apparatus.

Referring to FIGURES 1 and 2 of the drawings, one preferred embodiment of the invention there shown, is intended for performing earth working operations on the bed of a body of water utilizing a floating marine vessel 2 movable forwardly in a longitudinal direction. The apparatus includes ground-engaging means generally designated 4 adapted for sliding motion along the bed and connected to the lower end of a rigid elongate, open work ramp 6 of the type frequently referred to as a stinger. At its upper end, the stinger 6 is adapted for connection to the vessel 2 by a gimbal hitch 8 permitting relative motion between the vessel 2 and the stinger 6 about one generally transversely extending pivotal axis and two mutually perpendicular rotational axes perpendicular to the one pivotal axis. As the vessel 2 undergoes pitching, yawing and rolling motion relative to the stinger under the influence of external forces, including wind and wave action, the gimbal hitch 8 permits such relative angular displacements thereby reducing the loads imposed upon the stinger.

The previously mentioned ground-engaging means 4 includes a skid 10 fixedly secured to the lower end of the ramp 6 for sliding motion along the water bottom. The skid 10 is pivotally connected to a rearwardly extending frame 12 provided at its rearward end with rear skids 13 adapted for sliding motion on and along the surface of the bed. A plow 14 pivotally connected at its forward end to the skid 10 is connected adjacent its rearward end to the frame 12 by a selectively vertically adjustable plow depth control apparatus 16. In an important aspect of the invention, the vertical spacing between the plow 14 and the frame 12 may be selectively varied to cause the lowermost portions of the plow 14 to extend to varying depths below the skid 10 and the rear frame skids 13, into the underlying water bed. In this manner, the depth of cut of the plow 14 may be varied. In the preferred embodiment, the selectively adjustable connecting means 16 comprises a hydraulic jack which may be selectively supplied with hydraulic fluid from a source on the vessel (not shown) to permit control of the depth of cut from the vessel. In an alternative embodiment, the connecting means 16 may comprise a manually adjustable, selectively lockable mechanism permitting the depth of cut to be varied by divers sent down from the surface.

To provide a continuous indication of the depth of cut which the plow 14 is making, a sensor 20 (FIGURE 2) connected between the plow 14 and adjacent portions of the frame 12 is also provided. The sensor 20 is connected by suitable means to a suitable indicator positioned on the vessel.

One or more (generally two), laterally spaced elongate pipes 22 of limited flexibility are guided smoothly in a path from the vessel 2 into the trench dug by the plow 14. To prevent any disturbed material thrown up by the plow 14 during trenching from settling back and remaining in the trench beneath and ahead of the pipes 22 during pipelaying, an eductor 26 extends into the trench for sucking loose detritus therefrom and projecting it away from the trench. To prevent the eductor 26 from becoming hooked about any major obstruction extending into the trench, such as, for example, a firmly embedded rock which the plow 14 may have previously overridden, a pivotal mounting 28 is provided between the eductor and the rear frame 12. The pivotal mounting 28 permits the eductor 26 to be vertically free swinging so it may ride freely over any obstructions encountered in the trench without injury to the apparatus.

The foregoing generally discussed portions of the apparatus are discussed in more detail hereinafter.

The skid, stinger and gimbal hitch

The previously mentioned stinger 6 (FIGURE 1) is a conventional trusslike, openwork structure including two laterally spaced, longitudinally extending bottom chords 100 and a longitudinally extending top chord 102 spaced laterally, intermediate and vertically above the bottom chords 100. The chords 100 and 102 are connected by intermediate conventional, crossbracing 104. At their upper extremity, the top and side chords 102 and 100 are fixedly connected to a member 106 (FIGURE 3) aligned transversely to the chords 100. In order to provide support for the previously mentioned pipes 22 laid from the vessel such as to maintain them in a gently curved, generally S-shaped configuration during their passage from the vessel 2 to the base of the trench, a plurality of longitudinally spaced roller frames 107 (FIGURE 1A) are provided. Each of the roller frames includes a support frame 107a secured transversely between adjacent ones of the crossbraces 104 of the stinger. The lower part of the support frame includes a plurality of longitudinally spaced, transversely extending rollers 107b underlying and supporting the pipes 22. Adjacent the longitudinal midpoint of the frame 107a are three vertically disposed rollers 107c for centering the pipes transversely of the stinger. Top rollers 107d limit upward motion of the pipes. Although the frames 107a fixedly secured to the stinger in the preferred embodiment, it will be appreciated that a pivotal mounting may be provided to permit the frame to conform to the slope of the pipe. The rollers 107b, 107c, 107d thus completely eliminate all sliding contact between the pipe and fixed members of the stinger, thus preventing damage to the corrosion coating on the pipe as well as wear on the stinger members.

The previously mentioned skid 10 is disposed symmetrically of and extends laterally beyond the lateral extremities of the stinger 6. The skid 10 includes a flat, generally rectangular upper surface fixedly secured adjacent its forward edge to the undersurfaces of the previously mentioned chords 100 of the stinger 6 and disposed in the same plane thereas. The lower surface of skid 10 extends downwardly and outwardly from the forward and rear edges of the upper surface of the skid 10 and is provided with a generally radiused configuration. The lower surface of the skid 10 is adapted to rest upon the bed and to towed therealong, its rounded configuration assisting the skid in riding over any surface discontinuities such as boulders and the like. To prevent random lateral sidewise movement of the skid 10, it is provided on its undersurface with several transversely spaced, radially extending, fixed blades 112 which cut into the surface of the bed. The blades 112 are curved generally to correspond to the lower surface of the skid 10 and extend downwardly and outwardly therefrom. To provide added rigidity for the skid 10, additional bracing 114 between the skid adjacent the rearward upper surface thereof and top chord 103 of the stinger 6 is provided.

The previously mentioned gimbal hitch 8 (shown in more detail in FIGURE 3) includes the previously mentioned horizontally disposed frame 120. The frame 120 includes two laterally spaced, forwardly projecting, horizontal lugs 122. Each of the lugs 122 is provided with a central, vertically and laterally extending, forwardly open slot 124 for receiving each of two vertically extending side member 126. Each member 126 is pivotally connected at its midpoint to its adjacent lug 122 for pivotal motion about a generally horizontal pivotal axis x—x, disposed generally transversely of the ramp. The side members 126 form part of a rectangular yoke 128 which includes horizontally and laterally extending, top members 130 integral with the side members 126. Pivotally connected to the top member 130 for rotation about a generally vertical, first rotational axis y—y perpendicular to the top members 130 is one arm 131 of a T member 132. The T member 132 includes a horizontally disposed central portion 134 extending radially outwardly from the central arm (z—z axis) of the T member 132. The cylindrical member 134 receives a rearwardly extending shaft 135 fixedly secured to the stern of the vessel 2. The member 134 and shaft 135 are connected together for relative rotational motion about another rotational axis z—z perpendicular both to the first rotational axis y—y and the pivotal axis x—x. Suitable means (not shown) are provided for preventing axial motion between the shaft 135 and the member 134. Alternatively, it would be possible to mount the frame member 106 on the vessel and connect the shaft 135 to the stinger, if so desired.

It will be appreciated that the mounting described permits the relative rotation between the vessel and the stinger about one generally transversely disposed pivotal axis during pitching of the vessel and also permits relative rotation about two mutually perpendicular rotational axes which are perpendicular to the one pivotal axis during rolling and yawing of the vessel.

In this manner, as the vessel 2 undergoes pitching, rolling and yawing motion, the relative pivotal and rotational motions of the vessel are not impressed upon the stinger 6, thereby relieving the stinger 6 of additional external loading which might cause undesirable stresses to be developed.

The plow and the elevating apparatus therefor

Figure 5:
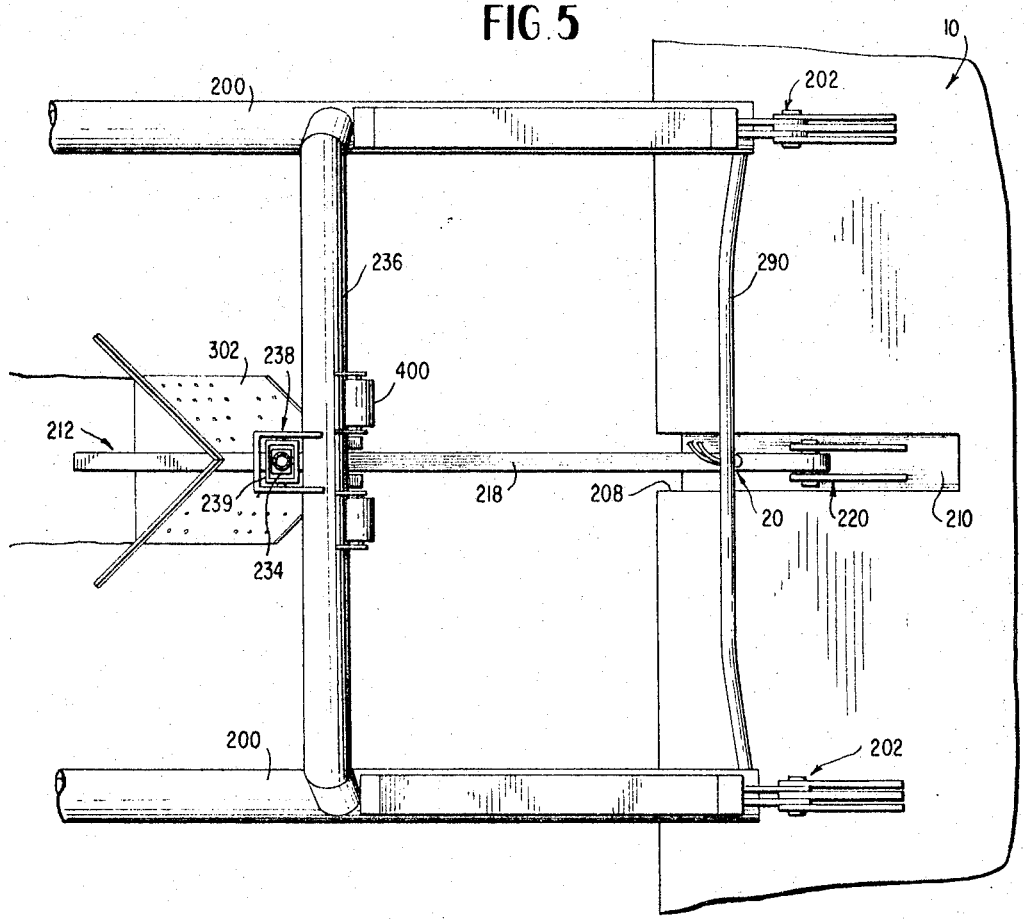
FIGURE 5 is a top plan view of the portion of the apparatus shown in FIGURE 4.

Referring to FIGURES 2, 4 and 5, the previously mentioned frame 12 includes two longitudinally extending struts 200 spaced laterally and symmetrically of the longitudinal axis of the stinger 6. At their forward ends, the struts 200 are connected to first or forward pivot points 202 secured to the upper surface of the skid 10 adjacent the longitudinal midpoint thereof, for pivotal motion about a horizontal axis.

At their rearward ends, the struts 200 are each provided with one of the previously mentioned rear skids 13. Each rear skid 13 includes a generally horizontal plate 204 fixedly secured to the strut 200 and having a curved forward end. The plates 204 are adapted to slide upon the surface of the adjacent water bottom. Projecting downwardly from the lower surface of each skid plate 204, perependicular thereto, is a dependent blade 206 which cuts into the underlying bed and resists random lateral forces acting on the skid 13 which might cause wandering motion of the end of the frame 12 with respect to the skid 10.

To receive the forward end of the previously mentioned plow 14, the skid 10 adjacent its transverse midpoint is provided with a forwardly and vertically extending slot 208 defined by vertically extending, transversely spaced side walls and a downwardly and rearwardly inclined front wall 210.

The plow 14 includes a vertically and longitudinally extending central member 212 having longitudinally and vertically extending flat side walls 213 spaced by a transverse dimension less than that of the slot 208. The central member 212 includes a generally triangular front portion 214 having a forward apex 216 defined by downwardly and rearwardly inclined upper and lower, laterally extending edges 218 and 220 respectively. The apex 216 is connected to a pivot point 222 secured to the top surface of the skid 10, for rotational movement about a generally horizontal axis. A generally rectangular rear end portion 224 of the central member 212 is defined by upper and lower, generally horizontal, transversely extending edges 226 and 228 respectively which intersect and blend with the respective upper and lower edges 218 and 220 of the forward section, and by a generally vertical rear edge 230.

During plowing operations, the lower edge 220 of the forward portion of the central member 212 extends below and rearwardly of the skid 10 to cut a trench in te bed (as will be described) with the lower edge 228 of the rear portion 224 resting generally horizontally on the bed of the trench, In this position, the upper edges 218 and 226 of the central member 212 are both spaced below the struts 200.

It will be appreciated that impingement of the lower forward edge 220 on the guide slot surface 210 provides one limitation on the depth of cut. However, in deep water, the inclination of the surface 210 is usually so steep as to permit the plow to cut to a greater depth than is normally likely to be required, so that it is therefore necessary to provide other means for limiting the depth cut. This function is effectuated by the provision of the previously mentioned selectively adjustable, connecting apparatus 16 (sometimes referred to as the depth control apparatus). In the preferred embodiment, the connecting apparatus 16 includes a hydraulic jack 234 connected with a vertically and laterally extending arch member 236 secured to and extending above and between the struts 200, by a gimbal joint 237. The joint 237 includes a horizontally disposed, rectanguar, U-shaped bracket 238 fixedly secured at its open extremities to the arch member 236. A rectangular, horizontally disposed frame 239 positioned within and spaced from the bracket 238 is pivotally connected thereto for motion about a horizontal, laterally extending axis. The jack 234 extends through the frame 239 and is pivotally connected thereto for motion about a horizontal, longitudinally extending axis. The jack 234 includes a depending vertically retractable plunger 240 vertically secured at its lower end to the upper forward edge 218 adjacent the rearward extremity thereof. The hydraulic jack 234 is connected by conventional hydraulic circuitry (not shown) to a suitable source of hydraulic fluid under pressure on board the vessel so that the plunger 240 may be selectively extended or retracted into the jack 234 to pivot the central member 212 about the pivot point 222 thereby causing corresponding lowering or raising of the plow relative to the frame 12. Such raising or lowering of the plow relative to the frame varies the depth of cut of the plow. In an extreme upward position of the plow 14 (shown in dotted lines in FIGURE 4) the lower edge 220 may be raised completely above the water bed so that no trench is cut.

It will be appreciated that in conditions requiring varying depths of cut such as, for example, the need to bury pipes of varying diameter or to bury pipe in areas of known turbulence or for other like reasons, the provision of a depth control system permitting the depth of cut to be varied remotely from the vessel is extremely advantageous. Such an arrangement permits a wide range of applications to be carried out using a single trenching apparatus with minimal disturbance of operations or loss of time. In addition, the hydraulic jack may also be used to exert additional downward pressure on the plow to make it penetrate to the desired depths, as is sometimes necessary when the seabed is unusually hard.

In order to guide the plow for vertical motion and to assist in supporting the plow against lateral displacements, two vertically extending guides 241 are provided. Each guide is fixedly secured at its upper extremity to the arch member 236 and extends downwardly in abutting sliding relation with the adjacent side wall 213 of the central member 212. Reinforcing bracing 242 secured to the lower end of each guide member 240 extends laterally and upwardly to a point of attachment to the arch member 236.

Figure 7:
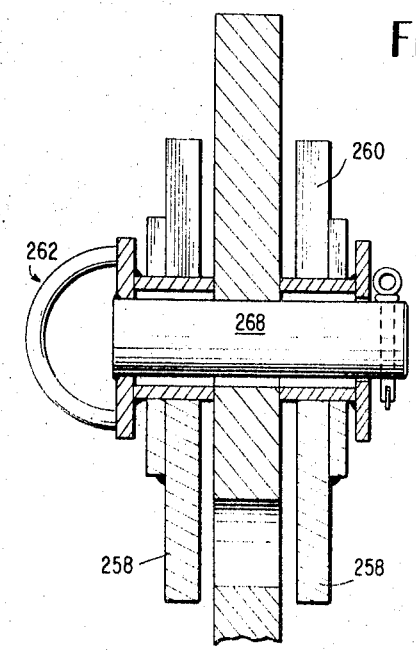
FIGURE 7 is a cross-sectional end view of a portion of the plow depth control apparatus shown in FIGURE 6 taken along the line 7—7 therein.
Figure 6:
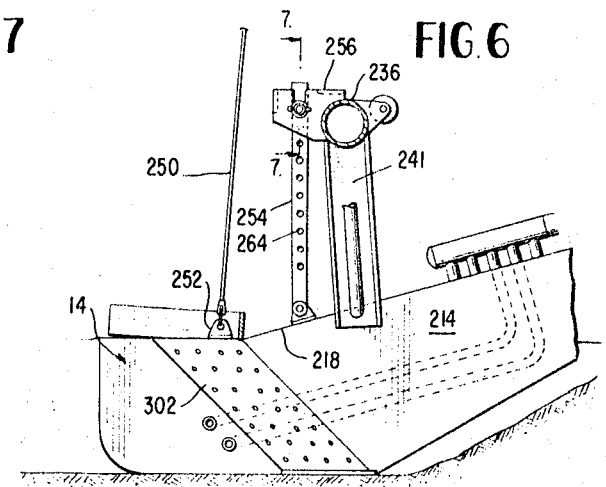
FIGURE 6 is a side view of an alternative embodiment of the plow depth control apparatus.

In an alternative embodiment of the invention shown in FIGURES 6 and 7, the plow 14 may be raised and lowered about its forward pivot point 222 by a winch line 250 connected to a lug 252 secured to the rear upper edge of the plow, and extending upwardly to a winch (not shown) positioned on the vessel. In this embodiment an elongate bar 254 is provided, pivotally secured at its lower end to the upper forward surface 218 of the plow. The bar 254 is vertically, slidably movable through a bracket 256 fixedly secured to the arch member 236. The bracket 256 includes two laterally spaced lugs 258 extending vertically and rearwardly on either side of the bar 254. The lugs are provided with aligned, vertically extending slots 260 having a closed lower extremity adapted to receive a transversely extending locking pin, generally designated 262. The bar 254 is provided with a plurality of vertically spaced, laterally extending holes 264 adapted to receive a central portion 268 of the locking pin 262. The locking pin 262 extends from the side of one lug 258 through the slot 260, a selected one of the holes 264 in the shaft 254 and through the slot 260 in the other of the lugs 258. The pin 262 rests in the bottom of the slots 260 and supports the bar 254 and hence the plow 14 against further downward movement, thereby limiting the depth of cut. Since the top of slot 260 is open, the plow is free to ride over obstructions or to be held in a raised position by the winch line 250.

In operation, using the second embodiment, a diver is sent down from the surface. The diver instructs the winch operator to raise the plow until the key 262 is raised vertically out of the slots 260, after which it may be easily manually removed from the bar 254 by the diver. The diver then inserts the key 262 into another of the holes 264 in the bar 254 corresponding to the new desired depth of cut. Bar 254 is restricted transversely by a plate across the back end of lugs 258, and cross member 236, so that the key 262 is guided to the slots 260. The key 262 bottoms again in the slots 260 when the plow cuts down to the newly selected depth.

To provide persons aboard the vesel with an indication of the depth for which the plow 14 is set to cut below the skids 10 and 13, the previously mentioned sensor 20 is provided. The sensor 20 includes a hydraulic cylinder 291 pivotally secured at its upper extremity to a cross arch member 292 extending above and secured at its opposed lateral extremities to the struts 200 adjacent the forward extremities thereof. The sensor 20 includes a depending plunger 292 extensible from the cylinder 291 and secured at its lower end to the forward upper edge 218 of the plow 14. As the plow 14 is raised or lowered, fluid is displaced from the hydraulic cylinder 20 through conventional hydraulic circuitry to a conventional fluid pressure responsive or fluid level indicator (not shown) positioned on board the vessel and adapted to give an indication proportional to the relative displacement between the plow 14 and the cross arch 290. Knowing the dimensions of the frame and the plow, it is possible to calibrate the indicator to read directly in terms of the depth to which the plow 14 extends below skid 10. In this manner, useful information on the depth of the trench being cut is provided.

Figure 8:
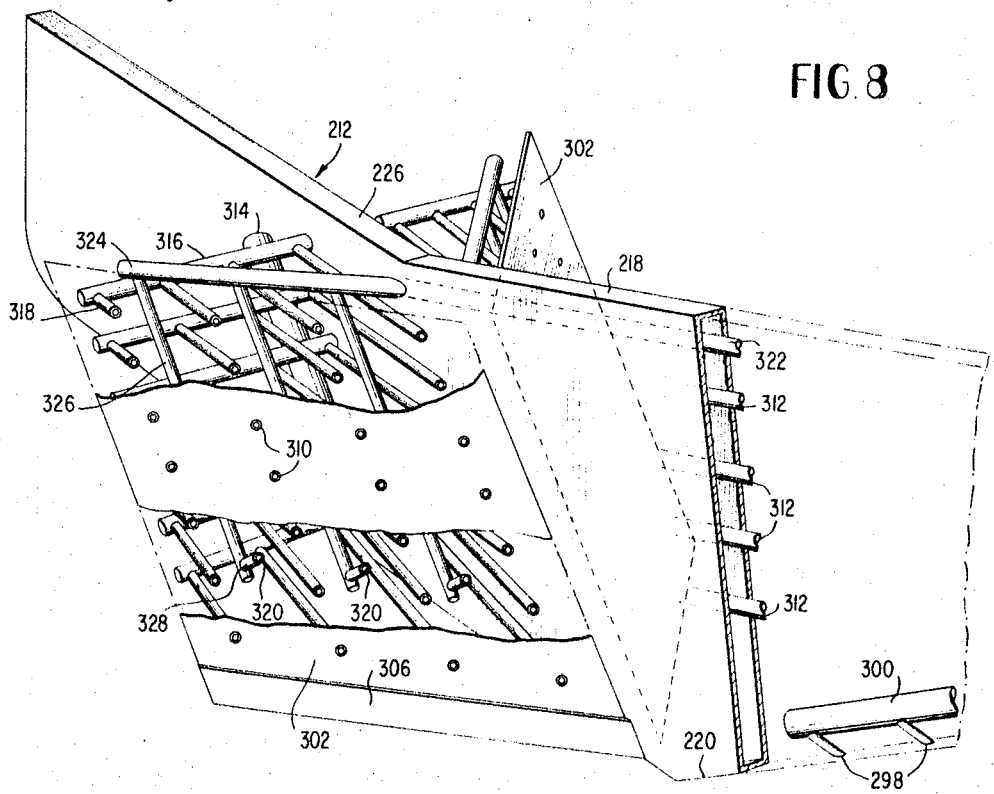
FIGURE 8 is a perspective view partially broken away showing a plow forming a part of the apparatus shown in FIGURE 1.

The cutting action of the plow 14 is aided by the action of a large number of forwardly directed fluid-directing nozzles which sluice away the water bed in advance of the plow. The previously mentioned lower forward edge 220 of the central member 212 is provided with a number of fluid-directing nozzles 298 (FIGURES 4 and 8) adapted to direct water outwardly at a downward and forward inclination, at high pressure into the adjacent water bed to cut a trench therein. The nozzle 298 are supplied with water from a header pipe 300 supplied with water under pressure from a conventional source (not shown).

Although the forward edge 220 of the central member 212 cuts the leading opening in the bed, this opening must be widened to provide a trench of sufficient width for the reception of the pipes to be laid. For this purpose, two earth removing wings 302, positioned on and secured to opposite lateral sides of the central member 212, are provided. Each of the wings is generally rectangular in form and extends rearwardly and laterally outwardly from the central member 212. Each wing 302 is additionally inclined in the vertical plane and has an inner edge adjacent the central member 212, extending from a lower point rearwardly adjacent the lower end of the forward edge 220, rearwardly and upwardly to a point generally adjacent the junction of the forward and rear upper edges 218 and 226, respectively. The wings 302 function to displace the soil upwardly and laterally outwardly to form a trench behind the wings.

To provide added rigidity for the wings 302 and to assist their cutting action in their passage through the sea bed, each of the wings 302 at its upper and lower extremities is provided with upper and lower, heavy duty blade portions 306 and 308, respectively, fixedly secured to the wings.

The disintegration of the soil forwardly of each wing 302 is largely effected by the provision of the plurality of jet orifices 310 disposed in vertically spaced, generally horizontal rows fixed in the wing surface for directing water outwardly and forwardly of the wing under pressure. Water for the jet orifices 310 is supplied under pressure from a high pressure water source (not shown) on the vessel to a plurality of conduits 312 extending longitudinally of and within the central member 212.

Fluid for the conduits 312 and for other functions described hereinafter is, desirably, pumped down from the vessel utilizing the interiors of one or more of the chords 100 and 102 of the ramp 6 as conduits (in a manner somewhat similar to the use of hollow struts disclosed in applicant's copending application Ser. No. 545,856, filed on Apr. 27, 1966). Two vertically extending water header pipes 314 in fluid communication with the conduits 312 are secured to the central member 212 on either side thereof behind and adjacent the wings. Extending laterally through the central member 212 in the area behind the wings and spaced vertically are a plurality of cross tubes 316 in fluid communication with the water header pipes 314. A plurality of forward pipes extending at laterally spaced intervals from each of the tubes 316 direct water under pressure to individual ones of the adjacent jet orifices 310.

Also provided on each of the wings 302 is a row of nozzles 320 for directing compressed air outwardly of the wings 302. Air under pressure from a source on the vessel (not shown) is delivered through a conduit 322 to one of two horizontally disposed, rearwardly and laterally extending air header pipes 324 secured to the central member 212 rearwardly adjacent the wings 302. A plurality of downwardly extending supply pipes 326 spaced laterally along the pipe 324 conduct the air under pressure to a plurality of cross pipes 328 in fluid communication with individual ones of the previously mentioned air nozzles 320. The air nozzles 320 are angled generally upwardly so that the compressed air issuing from the nozzles provides an upwardly moving film of bubbles which carry with them the soil displaced by the liquid jets issued from the orifices 310, to enhance the digging action of the plow.

It will be appreciated that the various pipes just described for delivering air and water to the nozzles additionally and importantly function to maintain the rigidity of the wings 302 during their passage through the water bottom.

The eductor and pipelaying guides

It is desirable that the previously mentioned pipes paid out from the vessel 2 should assume a gently curved, sinuous configuration in their passage from an initial position horizontally disposed in parallel relation to the deck of the vessel 2 to their final position horizontally disposed along the bed of the trench, if permanent deformation or failure of the pipes is to be avoided. To support the pipes in their desired configuration, the previously mentioned roller stations 107 supported on horizontal cross bars 110 and vertical bars 105 secured to various of the cross-bracing members 104 are provided at suitably located levels on the stinger 6 in underlying, supporting relation to the pipes 22.

To guide the pipe in the latter part of its motion, freely rotatable, horizontally disposed rollers 400 are rotatably mounted on the forward portions of the previously mentioned arch member 236. The upper portions of the rollers 400 contact the lower surfaces of the pipes 22 and prevent contact between the pipes and the arch member 236 while the two pipes 22 pass on either side of the jack plunger 241. The pipes 22 then pass to a cradle 401 which includes a plurality of transversely spaced frames 402 fixedly mounted on a horizontally disposed, transversely extending axle 404. The axle 404 is rotatably mounted to the adjacent struts 200. A plurality of laterally extending, horizontally disposed rollers 406 are rotatably mounted between adjacent ones of the frames 402 and underlie the pipes 22 in abutting supporting relation with the axle 404 permitting the cradle 401 to freely assume the same slope as the pipes.

Spaced rearwardly of the axle 404 is a vertically extending, rigid frame 408 fixedly secured to the struts 200 and including vertically spaced, horizontally disposed, transversely extending, rigidly fixed upper and lower members 410 and 412, respectively. Four vertically extending rollers 414 extending between the members 410 and 412 are mounted for rotation about vertical axes. The central two of the rollers 414 are aligned with the longitudinal axis of the frame 12, with the other two of the rollers 414 disposed symmetrically on either side. The pipes 22 pass between the rollers 414 and are guided thereby into the center of the trench.

In order to ensure that none of the disturbed soil, and other detritus in the wake of the plow 14 settles and remains in the trench beneath and ahead of the pipes 22, the previously mentioned eductor 26 is provided.

The eductor 26 (FIGURES 9–11) includes a vertically extending oval tube 420 having its major axis aligned with the longitudinal axis of the frame 12. At its upper extremity, the tube 420 is rotatably connected to a sidewardly bent branch tube 422 and provided with guide vanes 421 mounted vertically to insure alignment of tube 422 with the current so that material is directed away from the eductor and widely diffused by the current. At its lower end, the tube 420 is cut away to have a generally downwardly and rearwardly inclined open lower end. A vertically extending, downwardly depending, L-shaped shoe 424 secured to the rearward exterior surface of the tube 420 is provided with a ground contacting, rearwardly bent portion 426 adapted to contact the bottom of the trench during normal usage of the apparatus to cause the tube 420 to be positioned at a forward and upward inclination relative to its previously mentioned pivotal support. Loose soil and other detritus settling behind the plow 14 into the trench is sucked up into the base of the tube 420 and projected out of the trench through the tube 422 by a plurality of compressed air and high pressure water, nozzles extending into the tube 420 adjacent the lower end thereof. The high pressure nozzles include two pairs of water injecting nozzles 430 positioned adjacent the lower end of the tube 420. Each pair of water injecting nozzles 430 is positioned adjacent one curved end of the oval pipe 420 and includes two separate pipes 432 entering the pipe 420 at two radially spaced positions on the curved portion. The nozzles 432 are directed generally radially inwardly of the curved portion of the pipe 420 and are also inclined upwardly into the interior of the pipe 420. Each pair of water pipes 430 is provided with water under high pressure from one of two axially extending water conduits 434 positioned externally of the tube 420 and connected to a suitable, remotely positioned source of water under pressure. The water leaving the tubes 432 at high velocity sucks in and entrains detritus in the zone adjacent the lower end of the pipe 420 to remove it from the bottom of the trench, in a manner well known for eductors.

A set of pairs of air pipes 440 spaced axially above the previously described sets of pipes 430 and generally similar in the disposition thereto is connected to similar vertically extending air conduits 442 connected to a remotely positioned source of compressed air. The pipes 440 provide a stream of upwardly travelling bubbles which further assist in carrying detritus out of the trench upwardly of the pipe 420 and outwardly of the pipe 422. Supporting the eductor 26 in its previously mentioned forwardly and upwardly inclined position within the center of the trench is a horizontally disposed V-member 450 having its apex secured to opposite sides of the pipe 420 and extending forwardly and laterally divergently therefrom. The forward extremities of the V-member 450 are pivotally connected by brackets 452 to the previously mentioned top member 410 of the support 408 for pivotal motion about a horizontal axis. The V-member 450 also includes a transverse strut positioned intermediate the longitudinal extremities of the V-member 450 and having its lateral extremities secured to adjacent portions of the V-member 450. A supporting strut 456 is fixedly secured to the midpoint of the strut 454 and extends downwardly and rearwardly thereto to a point of connection with the pipe 420.

It will be appreciated that the pivotal mounting of the eductor 26 afforded by the V-member 450, the brackets 452 and the top member 410 permits the pipe 420 to assume its normally inclined position in use with the foot 424 resting on the bed of the trench. As will be appreciated, this arrangement permits the eductor 26 to reposition itself automatically with its lower opening in its desired location adjacent the bottom of the trench whenever the depth of the cut trench is altered by adjustment of the setting of the plow 14 relative to the frame.

This free pivoting mounting of the eductor 26 offers particular advantages in the event that a substantial obstruction should be present in the trench. For example, during motion of the apparatus along the water bottom a submerged and deeply embedded rock or the like may be encountered. In this event, the forward skid 10, together with the plow 14, may ride upwardly and over the rock and recommence trenching on the forward side thereof. In this event, the embedded obstruction now positioned between the plow 14 and the eductor 26 would be subsequently engaged by the eductor. It will be appreciated that when this occurs the pivotal mounting provided for the eductor permits the eductor to swing freely upwardly and over the obstruction without damage. Additional swinging motion for the eductor in the event of exceptional displacements is afforded by the first pivotal connection between the frame 12 and the skid 10.

To assist the eductor 26 to clear any such embedded obstruction, a generally semi-circular plate 460 is fixedly secured to the tube 420 adjacent the lower end thereof and extends radially outwardly and forwardly from the forward end portion of the tube 420. The plate 460 contacts the obstruction in advance of the tube 420 and due to its rounded shape, assists in guiding the tube over the obstruction and at the same time protects the lower end of the tube, through which the detritus enters from, from direct impact with the obstruction.

In order to provide additional protection for the previously mentioned air and water conduits 434 and 442, respectively, axially extending forward and rear, semi-circular guard conduits 462 and 463, respectively, are secured to the forward and rear curved exterior portions of the tube 420.

SUMMARY OF ADVANTAGES

The method and apparatus of the present invention provide considerable advantage in the performance of underwater operations, notably pipelaying and trenching operations.

Particularly advantages are provided by the vertically adjustable connection afforded between the plow and the ground-engaging sled which permits the depth of trench cut to be readily varied without any need to remove the apparatus from its submerged position. In this connection, the provision of remotely operated connecting apparatus permitting the plow to be elevated and lowered relative to the frame under the control of persons positioned remotely on the vessel is particularly valuable.

Associated with the advantages provided by the plow elevating system are those afforded by the sensor positioned between the plow and the frame which provides a remote indication for persons on the vessel of the depth to which the plow is trenching relative to the frame.

Also of great significance is the provision of an eductor spaced rearwardly of the plow for removing detritus from the trench prior to laying of pipes therein. In this connection, the provision of a free swinging eductor able to pivot freely out of the way of substantial obstructions encountered in the trench is particularly important in minimizing the possibility of damage to the eductor. The provision also of a first pivotal connection between the frame and the sled permits even higher elevation of the eductor if the size of the obstruction should render this necessary.

Other significant advantages are provided by the gimbal hitch connecting the rigid stinger to the vessel. By permitting free relative pivotal and rotational movement between the stinger and the vessel arising during yawing, rolling and pitching motions of the vessel, caused by external forces such as wind and wave action, the loads imposed on the stinger as a result of relative motion between the stinger and vessel are practically eliminated.

Although the invention is described with reference to certain preferred embodiments, it will be apparent to those skilled in the art that adidtion, deletions, modifications, substitutions and other changes not specifically described and illustrated in the preferred embodiments may be made which will fall within the purview of the appended claims.

I claim:
1. Apparatus for laying pipe means of a type having limited flexibility in directions transverse to the length thereof, on the bed of a body of water, the apparatus utilizing a floating marine vessel movable forwardly along a longitudinal path, said apparatus comprising,
   ground-engaging means adapted for sliding motion on and along the surface of the bed of the body of water,
   elongated, rigid towing means connected with said ground-engaging means, said towing means being adapted for connection to the vessel, said towing means causing sliding motion of the ground-engaging means along the bed during motion of the vessel,
   plow means for cutting a trench in the bed of the body of water,
   selectively adjustable connecting means connecting said plow means with said ground-engaging means with portions of said plow means extending downwardly below said ground-engaging means whereby forward motion of the vessel causes said plow means to cut a trench in the bed, said connecting means being selectively adjustable to locate said portions of said plow means at varying predetermined depths below said ground-engaging means whereby the depth of the trench may be varied; and
   pipe supporting means connected with said rigid towing means adapted to support the pipe means at at least a plurality of points intermediate the vessel and the trench in a suitable configuration to avoid exceeding the elastic limits of the pipe means to prevent permanent deformation thereof.

2. An apparatus as defined in claim 1 further including, sensor means connected to said plow means and to said ground-engaging means for producing a signal proportional to the distance said plow means extends below said ground-engaging means, and
   indicator means adapted to be positioned on the vessel and connected with said sensor means responsive to the signal produced by said sensor means, said indicator means providing an indication of the depth to which said plow means extends below said ground-engaging means.

3. An apparatus as defined in claim 1 wherein said selectively adjustable connection means includes,
   guide means for guiding said plow means along a predetermined path of motion in a vertical plane relative to said ground-engaging means,
   power operated driving means connected with said ground-engaging means and said plow means for selectively moving said plow means along said predetermined path, and
   power means adapted to be positioned remotely on the vessel, said power means being selectively connected with said driving means for applying power thereto to raise and lower said plow means relative to said ground-engaging means.

4. An apparatus as defined in claim 1 wherein said selectively adjustable connecting means includes,
   pivot means connecting said plow means for pivotal motion relative to said ground-engaging means about a generally horizontal axis,
   support means connected to one of said plow means and said ground-engaging means, said support means including portions disposed closely adjacent the other of said plow and said ground-engaging means and movable relative thereto, and
   selectively, manually operable, hanging means for connecting said support means to said other of said plow means and said ground-engaging means in any one of several vertically spaced, predetermined positions relative to said other of said plow means and said ground-engaging means.

5. An apparatus as defined in claim 1 wherein said plow means includes,
   a longitudinally extending central member having forward and rear ends, said central member adjacent the forward end thereof being connected with said ground-engaging means, said central member having a forward edge extending generally downwardly of said ground-engaging means,
   a plurality of fluid directing outlets secured to said forward edge of said central member for directing fluid under pressure outwardly of said central member to sluice away adjacent portions of the bed,
   two wings disposed one each on either side of and secured to said central member, each of said wings extending generally rearwardly laterally of said central member, and
   a plurality of fluid directing outlets in the forward faces of each of said wings for directing fluid under pressure outwardly of said wings to sluice away adjacent portions of the bed to define a trench therein.

6. An apparatus as defined in claim 1 wherein said towing means comprises,
   a rigid elongate ramp having one longitudinal end thereof pivotally connected to said ground-engaging means and another longitudinal end thereof adapted to be pivotally connected to the vessel.

7. An apparatus as defined in claim 2 wherein said sensor means includes,
   a closed cylinder connected to one of said ground-engaging means and said plow means, a piston slidably and sealingly received within said cylinder defining a closed expansible chamber, said piston being connected to the other of said plow means and said ground-engaging means, said indicator means being in fluid communication with said expansible chamber, said indicator means producing an indication in response to displacements of fluid into and from said expansible chamber.

8. An apparatus as defined in claim 3 wherein said driving means comprises,
 a first axially extending member fixedly connected to said ground-engaging means,
 a second axially extending member movably connected with said first axial member and fixedly connected with said plow means,
 power operated motor means connected with said first and second axial members for moving said members axially of each other;
said power means being remotely connected with said motor means for applying power thereto to operate said motor means.

9. An apparatus as defined in claim 6, said pipe supporting means further including,
 a plurality of roller means connected with and spaced along said ramp and with said ground-engaging means, said roller means adapted to rollingly contact and support the pipe means to guide said pipe means in a gently curved, generally sinuous path from the vessel into the trench.

10. An apparatus as defined in claim 1 wherein said motor means includes,
 an expansible chamber fluid motor,
said power means including,
 a source of fluid under pressure, and a conduit in fluid communication with said source of fluid and said fluid motor.

11. An apparatus for performing earth working operations on the bed of a body of water utilizing a floating marine vessel movable forwardly along a longitudinal path, said apparatus comprising,
 ground-engaging means adapted to slide on and along the surface of the bed of the body of water,
 towing means connected with said ground-engaging means and adapted for connection to the vessel,
 said ground-engaging means including,
  trenching means for cutting a vertically and laterally extending trench in the sea bed,
  frame means extending rearwardly of said trenching means adapted for sliding motion along the bed adjacent the trench,
  first pivot means carried on said ground-engaging means pivotally connected with said frame for pivotal motion thereof about a generally horizontal axis,
 eductor means spaced rearwardly from said trenching means for removing detritus from the trench and for distributing the detritus outwardly of the trench, said eductor means having a lower end thereof adapted for positioning in the trench, and
 second pivotal means connecting said eductor means with said frame means for free swinging motion of said eductor means about at least one generally horizontally disposed axis.

12. An apparatus as defined in claim 11 wherein the vessel is further adapted for the laying of flexible, elongate pipe means and wherein,
 said towing means includes,
  a rigid elongate ramp having, one longitudinal end connected to said ground-engaging means, and another longitudinal end adapted for connection to the vessel;
 said apparatus further including,
  means on said ramp and on said ground-engaging means adapted to contact the pipe means to guide the pipe means downwardly from the vessel in a gently curved, generally sinuous path into the trench.

13. An apparatus as defined in claim 11 wherein said ground-engaging means further includes,
 a skid adapted for sliding movement on and along the surface of the bed;
 said trenching means including
  a plow extending rearwardly and downwardly from said skid and connected therewith.
 said frame means being connected by said first pivot means to said skid, and
 said second pivot means for connecting said educator means to said frame means including
  a joint permitting free relative pivotal motion between said eductor means and said frame means about a generally horizontally disposed laterally extending axis.

14. An apparatus for performing earth working operations on the bed of a body of water utilizing a floating marine vessel movable forwardly along a longitudinal path, said apparatus comprising,
 a rigid elongate ramp,
 gimbal hitch means connected to one longitudinal end of said ramp, said gimbal hitch means adapted for connection to the vessel, said gimbal hitch means supporting said ramp for relative motion between said ramp and said gimbal hitch means about one generally transversely extending pivotal axis, said gimbal hitch means additionally supporting said ramp for relative rotational motion between said ramp and said gimbal hitch means about two mutually perpendicular rotational axes both of which are perpendicular to said pivotal axis,
 ground-engaging means adapted for sliding motion on and along the surface of the bed,
 said ground-engaging means including,
  means for connecting said ground-engaging means to the other longitudinal end of said ramp,
  plow means for cutting a trench in the bed,
  selectively adjustable connection means for connecting said plow means to said ground-engaging means extending downwardly therefrom,
  frame means adapted for sliding motion on and along the surface of the bed,
  said connection means being selectively adjustable to locate said plow means at varying predetermined depths below said frame means;
 said ground-engaging means further including,
  a skid adapted for sliding motion on and along the surface of the bed,
  first pivot means pivotally connecting said skid and said frame means for relative pivotal motion about a horizontal axis;
 eductor means spaced rearwardly of said plow means for removing detritus from the trench, said eductor means having a lower end adapted to be positioned within a trench produced by said plow means, and
 second pivot means pivotally connecting said eductor means to said frame means for free swinging motion of the eductor means about at least one generally horizontal axis.

15. An apparatus for performing earth working operations on the bed of a body of water utilizing a floating marine vessel movable forwardly along a longitudinal path, said apparatus comprising,
 ground-engaging means adapted to slide on and along the surface of the bed of the body of water,
 towing means connected with said ground-engaging means and adapted for connection to the vessel,
 said ground-engaging means including,
  trenching means for cutting a vertically and laterally extending trench in the sea bed,
  frame means extending rearwardly of said trenching means adapted for sliding motion along the bed adjacent the trench,
  first pivot means carried on said ground-engaging means pivotally connected with said frame for pivotal motion thereof about a generally horizontal axis, eductor means spaced rearwardly from said trenching means for removing detritus from the trench and for distributing the detritus outwardly of the trench, said eductor means having a lower end thereof adapted for positioning in the trench, and second pivotal means connecting said eductor means with said frame means for free swinging motion of said eductor means;

said second pivotal means comprising a pivot joint between said eductor means and frame means, with said pivot joint having a pivot axis extending generally transversely of the longitudinal direction of said trench;

said second pivotal means being operable to permit said eductor means to freely pivot about said pivot axis toward a base portion of said trench; and said eductor means being freely pivotable toward said base of said trench, substantially independent of the position of said trenching means relative to said base of said trench.

16. An apparatus as defined in claim 1 wherein said towing means includes, a rigid longitudinally extending truss extending between and secured to said ground-engaging means and the vessel, said truss including a plurality of hollow, rigid chord members extending lengthwise of sai trussd, sai chord members adapted to function as fluid conduits for directing fluids from one end of said truss to the other;

first fluid conduits connecting certain of said chord members at the upper ends thereof to sources of fluid under pressure located on the vessel; and second fluid conduits connecting the lower ends of said certain of said chord members to portions of said ground-engaging means.

References Cited

UNITED STATES PATENTS

| | | | |
|---|---|---|---|
| 1,152,326 | 8/1915 | Lewis | 61—72.3 X |
| 1,220,189 | 3/1917 | Chapman | 61—72.3 |
| 3,004,392 | 10/1961 | Symmank | 61—72.4 |
| 3,103,790 | 9/1963 | Popich | 61—72.4 |
| 3,273,346 | 9/1966 | Delaruelle et al. | 61—72.3 |
| 3,280,571 | 10/1966 | Hauber et al. | 61—72.1 |
| 3,333,432 | 8/1967 | Hale et al. | 61—72.4 |
| 3,338,060 | 8/1967 | Harmstorf | 61—72.4 |
| 3,347,054 | 10/1967 | Sherrod | 61—72.4 |
| 3,390,532 | 7/1968 | Lawrence | 61—72.3 |

FOREIGN PATENTS 1,230,014  3/1960  France.

JACOB SHAPIRO, Primary Examiner

U.S. Cl. X.R.

37—58